(12) United States Patent
Badihi et al.

(10) Patent No.: US 11,693,169 B2
(45) Date of Patent: Jul. 4, 2023

(54) SILICON PHOTONICS COLLIMATOR FOR WAFER LEVEL ASSEMBLY

(71) Applicant: Mellanox Technologies, Ltd., Yokneam (IL)

(72) Inventors: Avner Badihi, Yokneam (IL); Henning Lysdal, Roskilde (DK)

(73) Assignee: Mellanox Technologies, Ltd., Yokneam (IL)

( * ) Notice: Subject to any disclaimer, the term of this patent is extended or adjusted under 35 U.S.C. 154(b) by 1 day.

(21) Appl. No.: 17/195,180

(22) Filed: Mar. 8, 2021

(65) Prior Publication Data
US 2022/0283352 A1   Sep. 8, 2022

(51) Int. Cl.
*F21V 8/00* (2006.01)
*H04J 14/02* (2006.01)

(52) U.S. Cl.
CPC ........... *G02B 6/002* (2013.01); *G02B 6/0065* (2013.01); *H04J 14/023* (2013.01)

(58) Field of Classification Search
CPC ............................... G02B 6/002; H04J 14/023
See application file for complete search history.

(56) References Cited

U.S. PATENT DOCUMENTS

| | | | |
|---|---|---|---|
| 7,283,448 B2 | 10/2007 | Sohn et al. | |
| 9,613,886 B2 | 4/2017 | Lin et al. | |
| 10,209,452 B1 | 2/2019 | Hung et al. | |
| 2013/0230274 A1* | 9/2013 | Fish | G02B 6/305 385/14 |
| 2016/0306110 A1* | 10/2016 | Lambert | G02B 6/136 |
| 2016/0370544 A1* | 12/2016 | Badihi | G02B 6/30 |
| 2021/0263216 A1* | 8/2021 | Bishop | G02B 6/4257 |

FOREIGN PATENT DOCUMENTS

WO   WO-2022084767 A1 *   4/2022

OTHER PUBLICATIONS

Teramount Ltd., "Next Generation Data Center Connectivity: Co-Packaged Optics for 25tb, 50tb, . . . Switches"; Teramount Presentation; dated Jun. 10, 2018; 19 pages.

* cited by examiner

*Primary Examiner* — Sung H Pak
(74) *Attorney, Agent, or Firm* — Moore & Van Allen PLLC; Michael M. McCraw

(57) ABSTRACT

Embodiments are disclosed for providing a silicon photonics collimator for wafer level assembly. An example apparatus includes a silicon photonics (SiP) device and a micro-optical passive element. The SiP device comprises a set of optical waveguides. The micro-optical passive element is mounted on an edge of a cavity etched into a silicon surface of the SiP device. Furthermore, the micro-optical passive element is configured to direct optical signals between the set of optical waveguides and an external optical element.

20 Claims, 9 Drawing Sheets

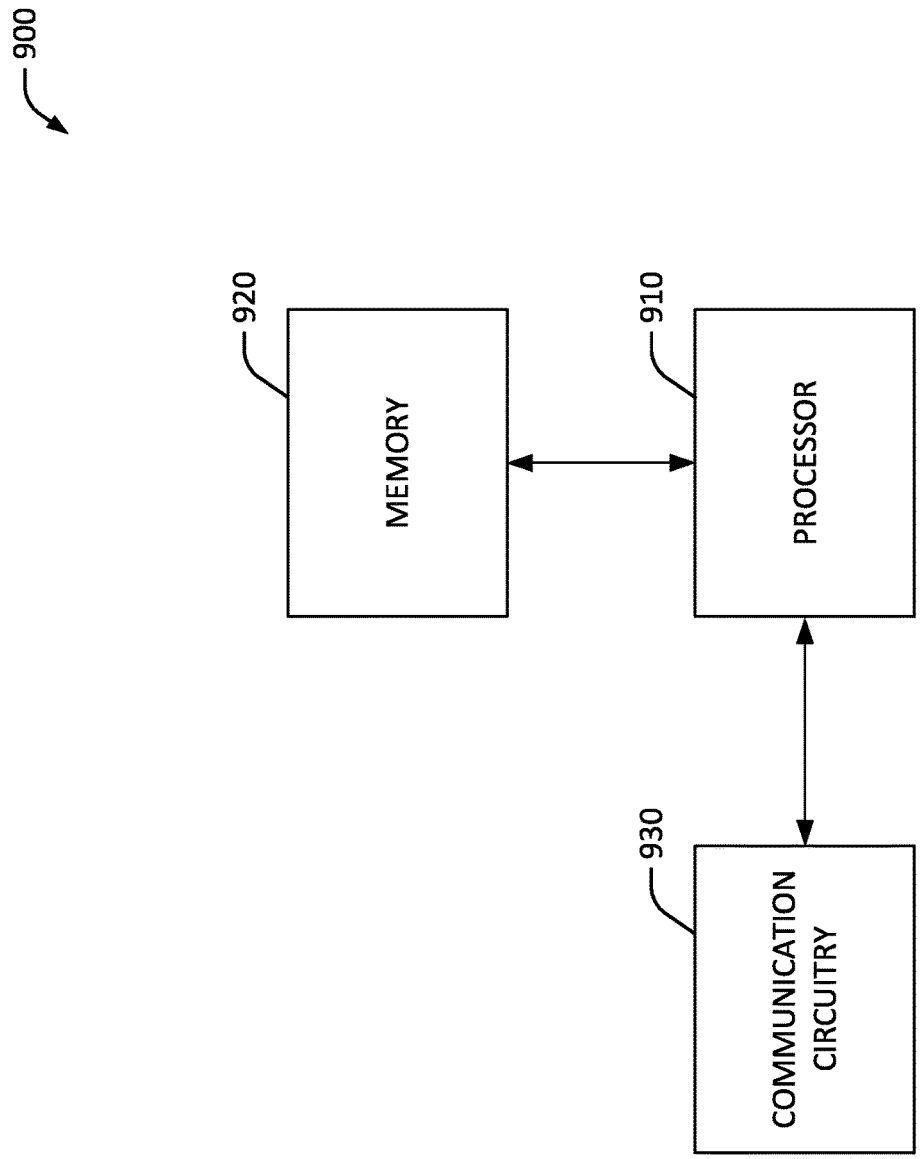

SILICON PHOTONICS COLLIMATOR FOR WAFER LEVEL ASSEMBLY

TECHNOLOGICAL FIELD

Embodiments of the present invention relate generally to optical assemblies for optical communication systems.

BACKGROUND

Silicon Photonics (SiP) is a technology that enables optical systems to be manufactured using silicon processes with silicon as the optical medium. Various optical components, such as interconnects and signal processing components, may be fabricated and integrated in a single SiP device. Some SiP devices are fabricated on a silica substrate or over a silica layer on a silicon substrate, a technology that is often referred to as Silicon on Insulator (SOI). In certain optical systems, a SiP device is attached to an external device to facilitate optical communications. However, it is generally difficult to accurately align light signals on the SiP with an external device that receives the light.

BRIEF SUMMARY

Example embodiments of the present invention relate generally to system(s), method and apparatus to provide a silicon photonics collimator for wafer level assembly. The details of some embodiments of the subject matter described in this specification are set forth in the accompanying drawings and the description below. Other features, aspects, and advantages of the subject matter will become apparent from the description, the drawings, and the claims.

In an embodiment, an apparatus comprises a silicon photonics (SiP) device and a micro-optical passive element. The SiP device comprises a set of optical waveguides. The micro-optical passive element is mounted on an edge of a cavity etched into a silicon surface of the SiP device. In one or more embodiments, the micro-optical passive element is configured to direct optical signals between the set of optical waveguides and an external optical element.

In one or more embodiments, the apparatus further comprises a mechanical structure that facilitates connection or disconnection between the external optical element and the micro-optical passive element.

In one or more embodiments, the cavity is a first cavity and the micro-optical passive element is a first micro-optical passive element. Additionally, in one or more embodiments, the apparatus further comprises a second micro-optical passive element mounted on an edge of a second cavity etched into the silicon surface of the SiP device.

In one or more embodiments, the micro-optical passive element is configured to direct the optical signals to one or more lenses. Additionally, in one or more embodiments, the one or more lenses provide the optical signals to the external optical element.

In one or more embodiments, the micro-optical passive element is configured to optically link the set of optical waveguides with the external optical element.

In one or more embodiments, the micro-optical passive element is configured to removably connect to the external optical element.

In one or more embodiments, the SiP device is a silicon optical chip.

In one or more embodiments, the micro-optical passive element is a light turning collimator.

In one or more embodiments, the external optical element comprises an optical fiber.

In one or more embodiments, the external optical element is another SiP device.

In one or more embodiments, the external optical element is an optical multiplexing device.

In another embodiment, a method is provided. The method provides for etching a cavity into a silicon wafer associated with a set of optical waveguides. The method also provides for mounting a micro-optical passive element onto an edge of the cavity, where the micro-optical passive element is configured to direct optical signals between the set of optical waveguides and an external optical element. The method is also provided for dicing the silicon wafer to form an optical apparatus that comprises the micro-optical passive element.

In one or more embodiments, the method further provides for attaching the optical apparatus to an optical fiber via the micro-optical passive element.

In one or more embodiments, the method further provides for attaching the optical apparatus to a silicon photonics (SiP) device via the micro-optical passive element.

In one or more embodiments, the cavity is a first cavity, the micro-optical passive element is a first micro-optical passive element, and the method further provides for etching a second cavity into the silicon wafer. In one or more embodiments, the method further provides for mounting a second micro-optical passive element onto the edge of the second cavity.

In one or more embodiments, the optical apparatus is a first optical apparatus and the dicing comprises dicing the silicon wafer to form the first optical apparatus that comprises the first micro-optical passive element and a second optical apparatus that comprises the second micro-optical passive element.

In one or more embodiments, the method further provides for directing the optical signals to one or more lenses. Additionally, in one or more embodiments, the method further provides for providing the optical signals to the external optical element via the one or more lenses.

In yet another embodiment, an apparatus comprises a silicon photonics (SiP) device, a micro-optical passive element, and an external optical element. The SiP device comprises a set of optical waveguides. The micro-optical passive element is mounted on an edge of a cavity etched into a silicon surface of the SiP device. The external optical element is mounted onto the micro-optical passive element. In one or more embodiments, the micro-optical passive element is configured to direct optical signals between the set of optical waveguides and the external optical element.

In one or more embodiments, the SiP device is a silicon optical chip. In one or more embodiments, the micro-optical passive element is a light turning collimator.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
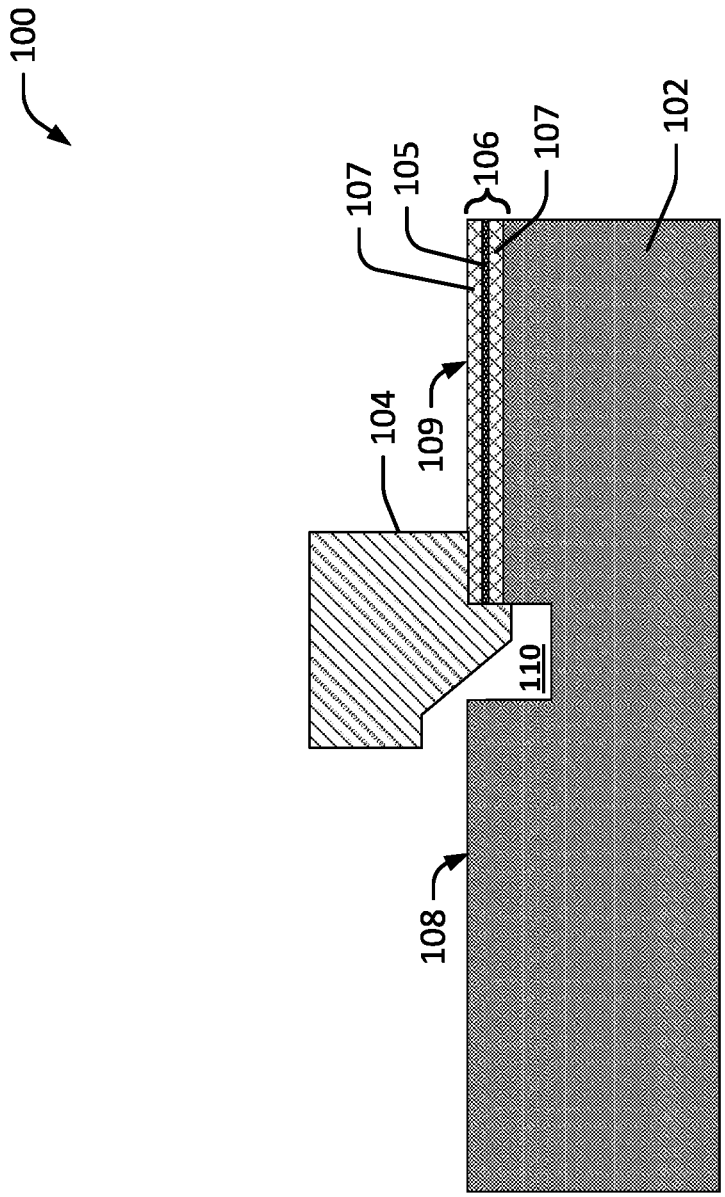
Figure 2:
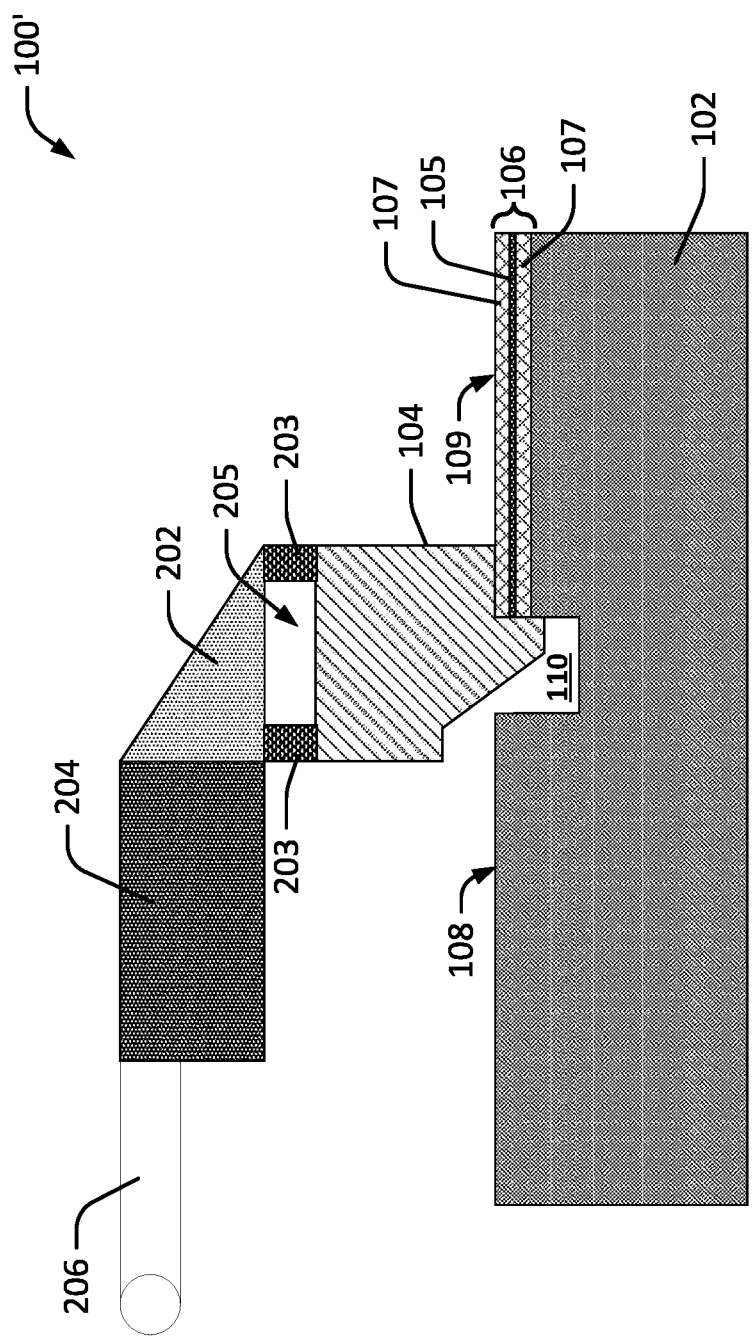
Figure 3:
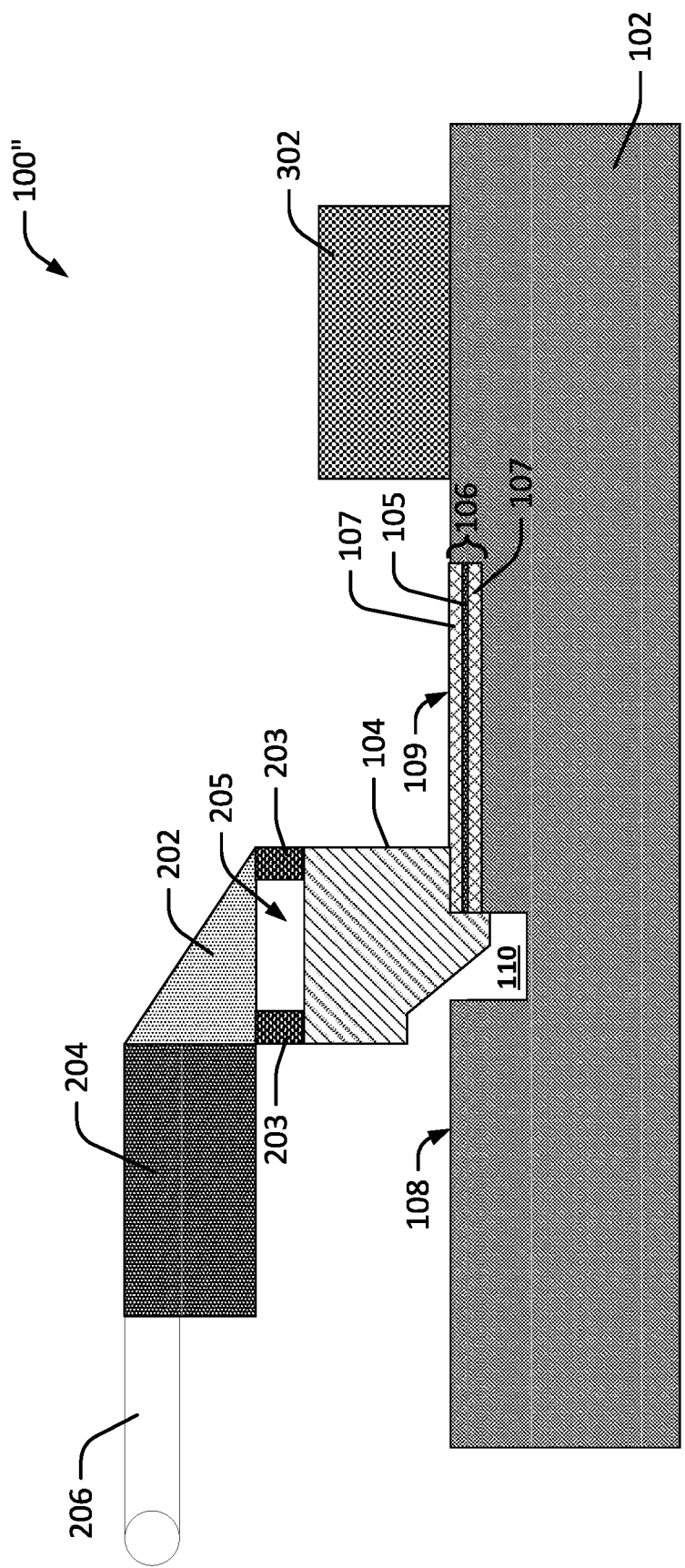
Figure 4:
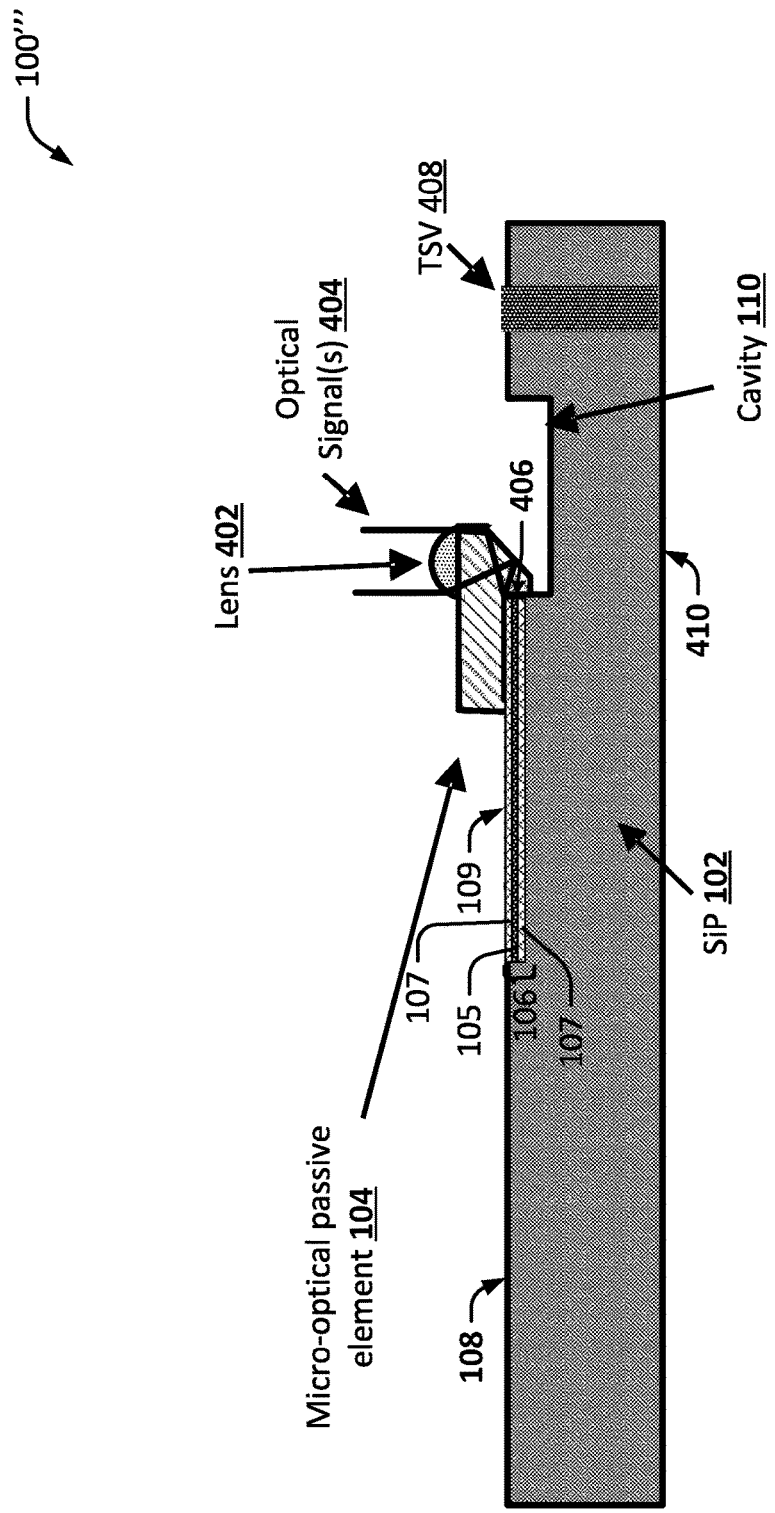
Figure 5:
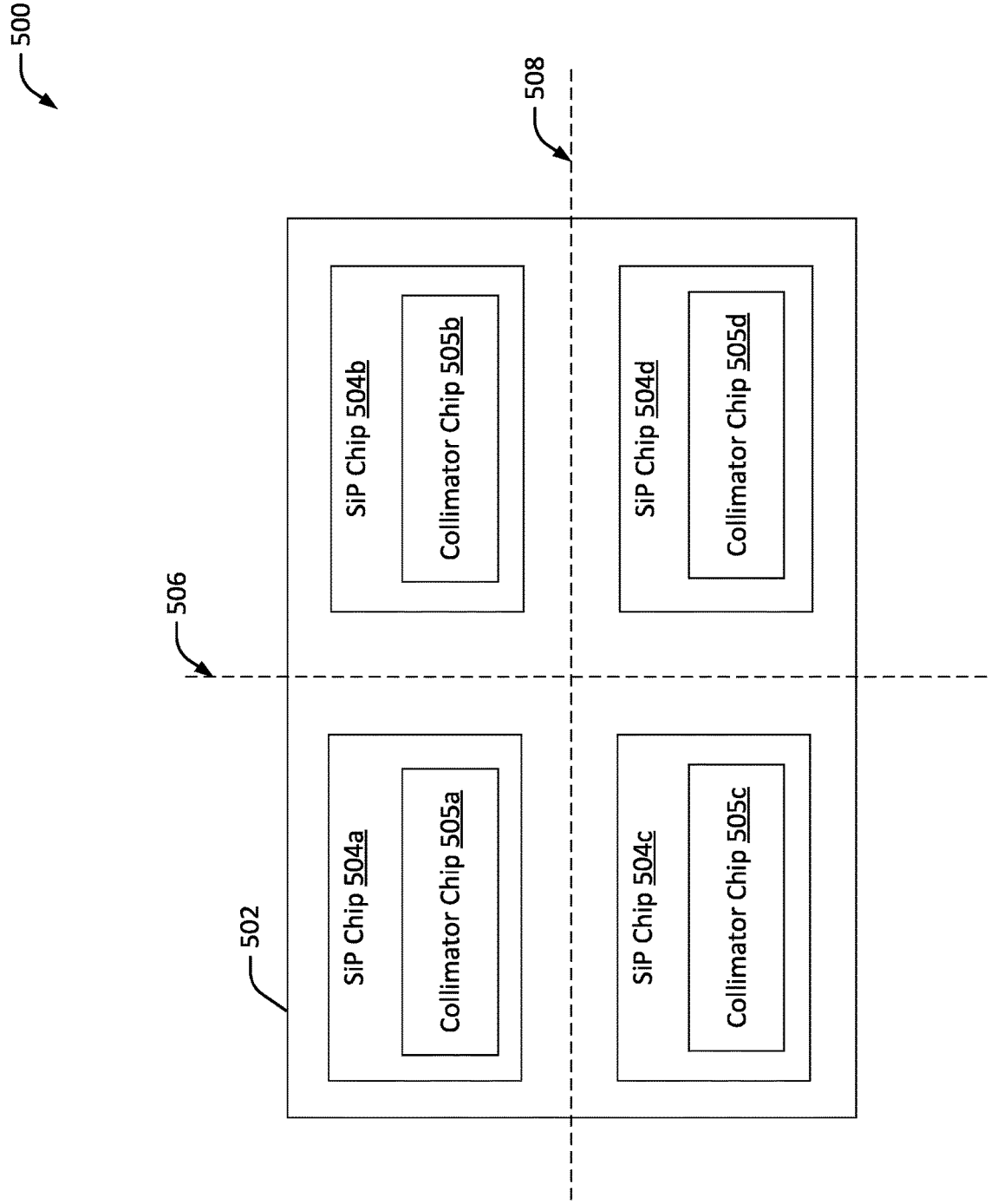
Figure 6:
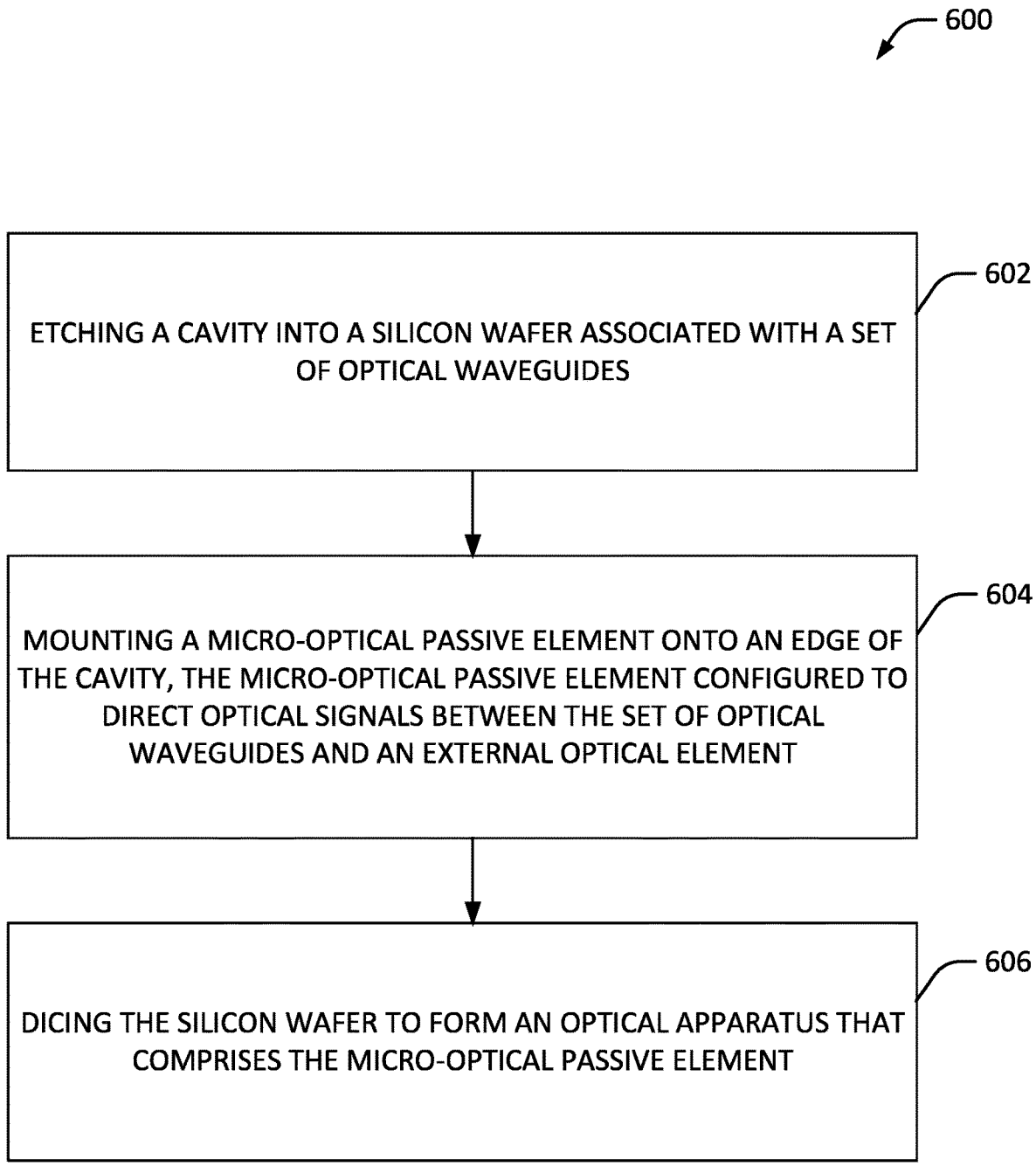
Figure 7:
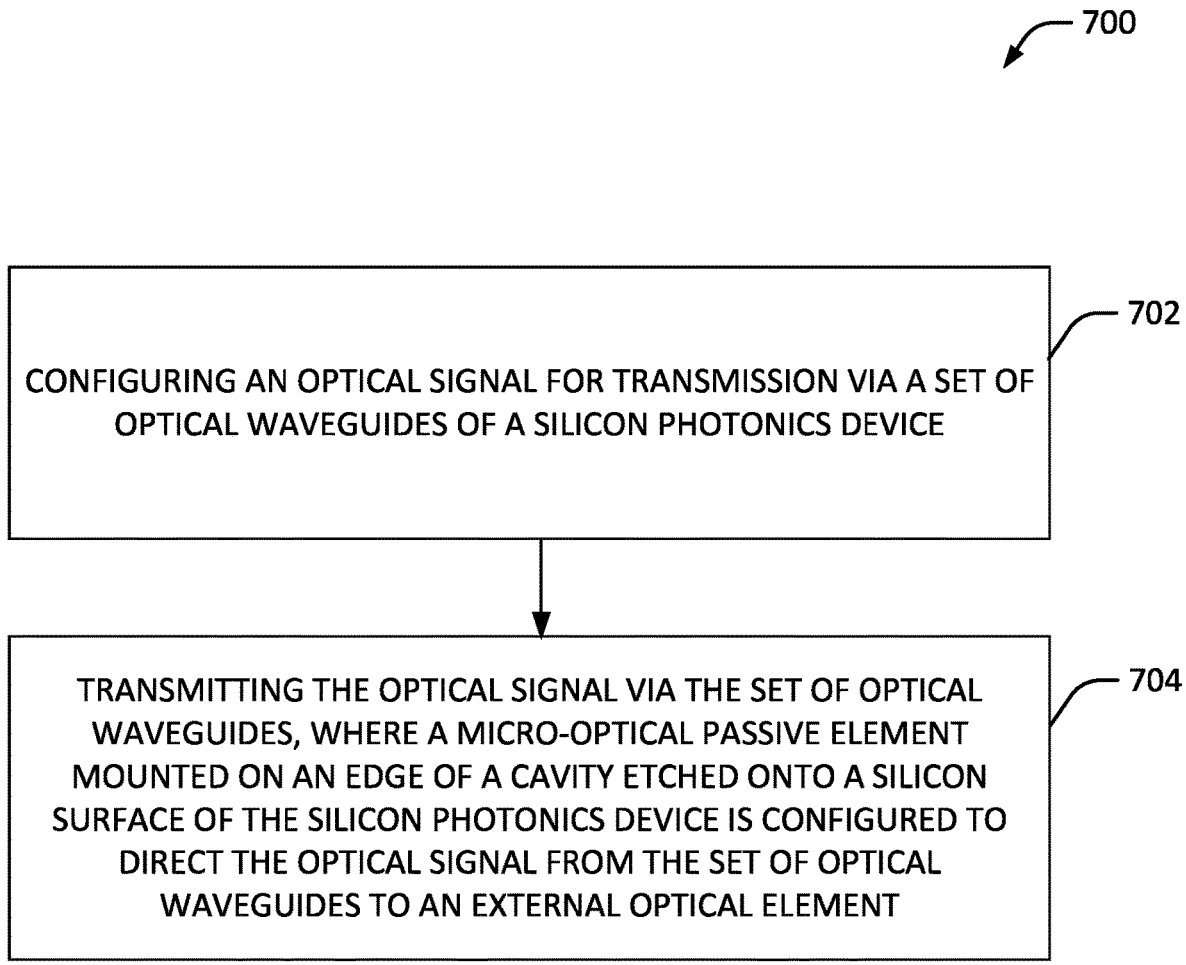
Figure 8:
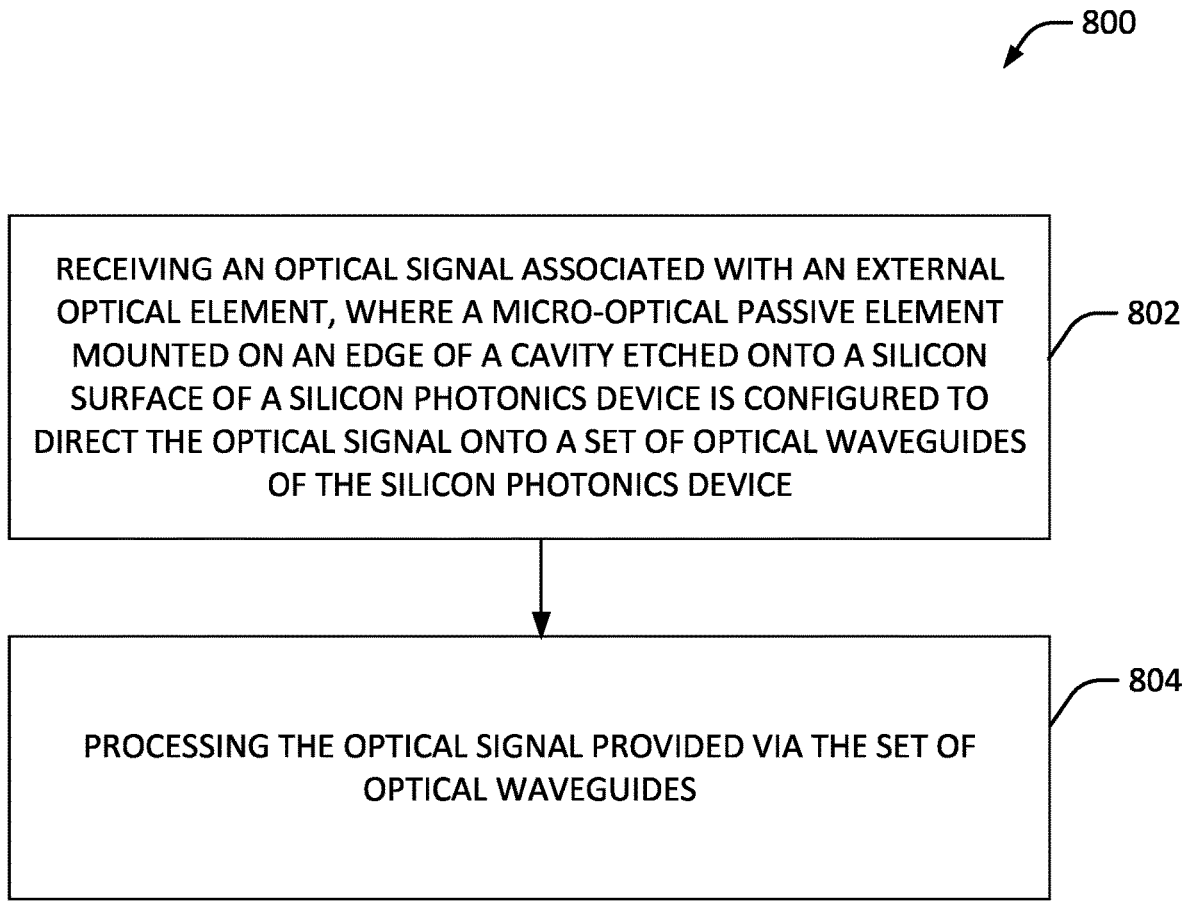

Having thus described the disclosure in general terms, reference will now be made to the accompanying drawings, which are not necessarily drawn to scale, and wherein:

FIG. 1 illustrates an exemplary system associated with a silicon photonics collimator for wafer level assembly, in accordance with one or more embodiments of the present disclosure;

FIG. 2 illustrates another exemplary system associated with a silicon photonics collimator for wafer level assembly, in accordance with one or more embodiments of the present disclosure;

FIG. 3 illustrates yet another exemplary system associated with a silicon photonics collimator for wafer level assembly, in accordance with one or more embodiments of the present disclosure;

FIG. 4 illustrates yet another exemplary system associated with a silicon photonics collimator for wafer level assembly, in accordance with one or more embodiments of the present disclosure;

FIG. 5 illustrates a system associated with silicon photonics chips, in accordance with one or more embodiments of the present disclosure;

FIG. 6 is a flowchart illustrating an example method for fabricating a silicon photonics collimator for wafer level assembly, in accordance with one or more embodiments of the present disclosure;

FIG. 7 is a flowchart illustrating an example method for providing optical communications via silicon photonics collimator, in accordance with one or more embodiments of the present disclosure;

FIG. 8 is a flowchart illustrating another example method for providing optical communications via silicon photonics collimator, in accordance with one or more embodiments of the present disclosure; and FIG. 9 illustrates an example computing system that may be embedded in the communication system, in accordance with one or more embodiments of the present disclosure.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. As used herein, the terms 'substantially' and 'approximately' refer to tolerances within manufacturing and/or engineering standards. Thus, use of any such terms should not be taken to limit the spirit and scope of embodiments of the present invention.

Silicon Photonics (SiP) is a technology that enables optical systems to be manufactured using silicon processes with silicon as the optical medium. Various optical components, such as interconnects and signal processing components, may be fabricated and integrated in a single SiP device. Some SiP devices are fabricated on a silica substrate or over a silica layer on a silicon substrate, a technology that is often referred to as Silicon on Insulator (SOI).

In certain optical systems, a SiP device is attached to an external device to facilitate optical communications. However, it is generally difficult to accurately align light signals on the SiP with an external device that receives the light. For instance, long range transmission of light signals is generally performed within optical fibers. When optical signals are generated or processed in a SiP device for transmission over optical fibers, the light needs to be coupled between the SiP device and the optical fibers. This coupling between the SiP device and the optical fibers is generally difficult because waveguides within the SiP device generally comprise a smaller diameter than the optical fibers. As such, a "world-to-chip" interface problem often arises in SiP technologies where coupling of light between Si wire waveguides and optical fibers, and vice versa, is generally inefficient.

Traditionally, for fiber-to-chip coupling, a fiber coupling technique using spot-size converters (SSCs) or grating couplers is employed. However, grating couplers for fiber-to-chip coupling typically provide a narrow bandwidth and/or an undesirable polarization sensitivity for certain optical applications. Furthermore, SSCs and grating couplers for fiber-to-chip coupling are generally attached to the chip through an adhesive bonding technique that results in a silicon communication chip with bundles of fibers attached thereto, resulting in increased complexity for handling and/or assembly of the chips onto other optical systems. Additionally, wafers for traditional SiP devices are generally diced (e.g., fully cut through) to create an edge for the wafer to expose waveguide facets and/or to facilitate butt attachment of the SiP device to an external device.

Thus, to address these and/or other issues, a SiP collimator for wafer level assembly is disclosed herein. The SiP collimator is, for example, an interconnection between a silicon optical chip and one or more optical fibers (e.g., a fiber bundle) to provide a connectable/disconnectable link (e.g., a connector between the silicon optical switch and the one or more optical fibers). In one or more embodiments, the SiP collimator is a micro-optical passive element mounted on a surface of the silicon optical chip. Additionally, in one or more embodiments, the SiP collimator deflects and/or collimates light emanating from one or more waveguides on the silicon optical chip, resulting in an array of light beams (e.g., an array of collimated light beams). The array of light beams can be, for example, an array of collimated and perpendicular light beams that can be captured by a collimator configured to focus collimated light beams onto the extremity of a single mode fiber with a particular insertion loss value (e.g., a modeled value of 0.5 to 0.7 dB from chip to fiber). In one or more embodiments, the collimator can provide the array of light beams onto one or more optical fibers (e.g., one or more single mode optical fibers). According to various embodiments, the SiP collimator is mounted on an edge of a cavity (e.g., a trench) etched into a surface of the silicon optical chip. In one or more embodiments, the SiP collimator can be mounted to a surface of the silicon optical chip at a wafer level during wafer level assembly of a SiP device. For instance, in one or more embodiments, the SiP collimator can be mounted at the wafer level prior to the silicon optical chip being diced. In one or more embodiments, optical testing (e.g., optical wave assessment) of the SiP device can be performed on the wafer level of the SiP device. Additionally or alternatively, in one or more embodiments, a surface of the silicon optical chip can include multiple cavities (e.g., multiple trenches) with corresponding SiP collimators such that multiple SiP collimators for the SiP device can be provided. In one or more embodiments disclosed herein, a connectable/disconnectable link element is provided between a SiP chip and a fiber to facilitate connecting the fiber at the convenient time (e.g., for testing prior to assembly, after the system has been fully assembled, etc.) while also minimizing human interaction with bundles of fibers connected to the SiP chip.

Accordingly, as compared to conventional SiP devices, embodiments disclosed herein provide for improved cost efficiency for fabrication of a SiP device. Additionally, as compared to conventional SiP devices, embodiments disclosed herein provide for improved performance of optical communications for a SiP device.

FIG. 1 illustrates a system 100 according to one or more embodiments of the present disclosure. In one or more embodiments, the system 100 can be an optical system (e.g., an optical communications system) related to SiP technologies. For example, in an embodiment, the system 100 can be an optical assembly (e.g., a miniature optical assembly) related to SiP technologies for optical communications. The system 100 includes a SiP device 102 and a micro-optical passive element 104. In one or more embodiments, the SiP device 102 can be a silicon optical chip. In certain embodiments, the SiP device 102 can be a SiP transmitter. Alternatively, in certain embodiments, the SiP device 102 can be a SiP receiver. Alternatively, in certain embodiments, the SiP device 102 can be a SiP transceiver. Additionally, in one or more embodiments, the SiP device 102 includes a set of optical waveguides 106. The set of optical waveguides 106 can be one or more structures configured to transmit (e.g., propagate) light via the SiP device 102. In one or more embodiments, a refractive index of the set of optical waveguides 106 can be greater than a refractive index of the SiP device 102 (e.g., the surface of the SiP device 102). In one or more embodiments, an optical waveguide from the set of optical waveguides 106 can include a core 105 and a clad 107. Light can be transmitted via the core 105. Furthermore, the clad 107 can be a surrounding medium for the core 105 that is not associated with transmission of light. The core 105 can comprises a higher index of refraction than the clad 107. In an embodiment, the core 105 can comprise silicon. Additionally, the clad 107 can include silicon dioxide or silicon nitride. However, it is to be appreciated that, in certain embodiments, the core 105 and/or the clad 107 can comprise a different type of material such that the core 105 comprises a higher index of refraction than the clad 107.

In one or more embodiments, the micro-optical passive element 104 is a light turning collimator. In an embodiment, the micro-optical passive element 104 can be configured as a focuser. In one or more embodiments, the micro-optical passive element 104 can be configured to provide an interconnection between the SiP device 102 and one or more external devices (e.g., one or more optical fiber devices and/or one or more optical fibers). For instance, in one or more embodiments, the micro-optical passive element 104 can be configured to deflect and/or collimate light received from the set of optical waveguides 106. In one or more embodiments, the micro-optical passive element 104 can be configured to provide an array of light beams in response to receiving the light from the set of optical waveguides 106. For instance, in one or more embodiments, the micro-optical passive element 104 can be configured to direct the light received from the set of optical waveguides 106 to form the array of light beams. In one or more embodiments, the micro-optical passive element 104 can include an array of lenses that focuses the light received from the set of optical waveguides 106 to form the array of light beams. For example, the array of lenses can be an array of collimating lenses that collimate the light received from the set of optical waveguides 106 to form the array of light beams. In one or more embodiments, the array of lenses of the micro-optical passive element 104 can be an array of micro-lenses.

In one or more embodiments, in response transmission of light to the set of optical waveguides 106, the micro-optical passive element 104 can be configured to receive an array of light beams from optical fiber devices and/or one or more optical fibers. For instance, in one or more embodiments, the micro-optical passive element 104 can be configured to direct light received from the set of optical fiber devices and/or one or more optical fibers to form the array of light beams and/or to transfer the array of light beams to the set of optical waveguides 106. In one or more embodiments, the micro-optical passive element 104 can include an array of lenses that focus light received from the optical fiber devices and/or one or more optical fibers as a formed array of light beams to the set of optical waveguides 106. For example, the array of lenses can be an array of collimating lenses that collimate light received from the array of light beams and to the set of optical waveguides 106. In one or more embodiments, the array of lenses of the micro-optical passive element 104 can be an array of micro-lenses. For example, the array of lenses can be an array of focusing lenses that focus light received as an array of light beams from a set of optical fibers toward the set of optical waveguides 106. In one or more embodiments, the array of lenses of the micro-optical passive element 104 can be an array of micro-lenses.

A portion of the micro-optical passive element 104 can be mounted on a surface 109 above the clad 107 of the SiP device 102. For example, a portion of the micro-optical passive element 104 can be aligned toward the set of optical waveguides 106. Additionally or alternatively, in certain embodiments, another portion of the micro-optical passive element 104 can be mounted on a surface 108 of the SiP device 102. Additionally, another portion of the micro-optical passive element 104 can be within a cavity 110. In one or more embodiments, the set of optical waveguides 106 can be located below the surface 109 of the SiP device 102. For example, the clad 107 can be located below the surface 109 of the SiP device 102. As such, the micro-optical passive element 104 can be mounted on an edge of the cavity 110 to access a waveguide facet of the set of optical waveguides 106 (e.g., to access the core 105) that provides entrance/exit of light into/out of the set of optical waveguides 106. The cavity 110 can be a trench etched into the surface 108 and/or the surface 109 of the SiP device 102. For example, the cavity 110 can be formed via an etching process (e.g., a dry etching process associated with plasma or a wet etching process associated with chemicals) that removes one or more layers of the surface 108 and/or the surface 109 to form the cavity 110. In another example, the cavity 110 can be formed via a laser process that removes one or more layers of the surface 108 and/or the surface 109 to form the cavity 110. In yet another embodiment, the cavity 110 can be formed via a three-dimensional (3D) printing process associated with formation of the SiP device 102. In an embodiment, the cavity 110 can include a set of walls and a floor surface below the surface 108 and/or the surface 109 of the SiP device 102. Additionally, in an embodiment, at least a portion of the set of optical waveguides 106 can form a portion of a wall of the cavity 110. For example, a wall of the cavity can include the set of optical waveguides 106 and a portion of the SiP device 102. Furthermore, in an embodiment, at least a portion of the set of optical waveguides 106 can form the edge of the cavity 110. In one or more embodiments, a portion of the micro-optical passive element 104 can be within the cavity 110 such that the micro-optical passive element 104 is mounted on the edge of the cavity 110 formed by at least the portion of the set of optical waveguides 106. For example, a portion of the micro-optical passive element 104 can be aligned with at least the portion of the set of optical waveguides 106 that form a portion of a wall of the cavity 110. In one or more embodiments, the micro-optical passive element 104 can be shaped to conform to a shape of the cavity 110 and to allow for provision of the set of optical waveguides 106 to the micro-optical passive element 104. In one or more embodiments, the micro-optical passive element 104 can be mounted to the surface 108 and/or the surface 109 of the SiP device 102 at a wafer level during wafer level assembly of the SiP device 102. For instance, in one or more embodiments, the micro-optical passive element 104 can be mounted at the wafer level prior to the SiP device 102 being diced. In certain embodiments, the cavity 110 is a first cavity and the micro-optical passive element 104 is a first micro-optical passive element. Furthermore, in certain embodiments, at least a second micro-optical passive element can be mounted on an edge of at least a second cavity etched into the surface 108 and/or the surface 109 of the SiP device 102.

FIG. 2 illustrates a system 100' according to one or more embodiments of the present disclosure. The system 100' can be an alternate embodiment of the system 100. The system 100' includes the SiP device 102, the micro-optical passive element 104, a mirror 202, and an optical element 204. The SiP device 102 includes the set of optical waveguides 106. Additionally, the cavity 110 is etched into the surface 108 and/or the surface 109 of the SiP device 102. In an embodiment, the system 100' can be a light coupling system to facilitate optical communications. In one or more embodiments, the micro-optical passive element 104 can be mounted on an edge of the cavity 110. Furthermore, the micro-optical passive element 104 can be configured to direct optical signals between the set of optical waveguides 106 and the optical element 204. In one or more embodiments, the optical element 204 comprises one or more optical fibers 206.

The mirror 202 can be mounted at a certain distance from the micro-optical passive element 104 via a mechanical structure 203. For example, the mechanical structure 203 can facilitate connection or disconnection of the mirror 202 and/or the optical element 204 to the micro-optical passive element 104. In an embodiment, the mechanical structure 203 can be a mechanical device (e.g., an optical connector) that facilitates fiber optic physical placement and/or retaining to provide optical interconnection. Additionally, in one or more embodiments, the mechanical structure 203 can provide a gap area 205 (e.g., an air gap, a space, etc.) between the mirror 202 and the micro-optical passive element 104. In an embodiment, the mirror 202 can deflect the array of light beams provided by the micro-optical passive element 104. For example, in an embodiment, the mirror 202 can capture the array of light beams provided by the micro-optical passive element 104. Furthermore, the mirror 202 can deflect the array of light beams onto the optical element 204, or vice versa. In one or more embodiments, the array of light beams can be, for example, an array of collimated and/or perpendicular light beams that can be captured by the mirror 202 and/or deflected by the mirror 202 onto the optical element 204. In an embodiment, the mirror 202 can deflect the array of light beams by a certain angle (e.g., 90 degrees) onto the optical element 204. It is to be appreciated that the array of light beams can alternatively be transmitted in a reverse direction. In certain embodiments, the mirror 202 can be a prism (e.g., a prism mirror) that deflect the array of light beams onto the optical element 204. In certain embodiments, the mirror 202 can be a prism (e.g., a prism mirror) with a lens that deflect and collimates an array of light beams from the one or more optical fibers 206, thus replacing the optical element 204. Additionally, in certain embodiments, the mirror 202 can be configured with a particular insertion loss value (e.g., a low insertion loss value within a range from 0.5 to 0.7 dB from fiber to chip, and chip to fiber) to facilitate deflecting the array of light beams onto the optical element 204 and the one or more optical fibers 206.

The optical element 204 can be an optical element (e.g., an external optical element, a focuser, etc.) that collimates light beaming coming out of/into the one or more optical fibers 206. The optical element 204 and/or the mirror 202 can be configured to removably connect to the micro-optical passive element 104. For instance, optical element 204 can be an optical connector that is pluggable with respect to the mirror 202 and/or the micro-optical passive element 104. In an embodiment, the optical element 204 can include one or more collimator lenses and/or a mechanical structure (e.g., a mechanical fiber block). In one or more embodiments, the optical element 204 can be configured to provide optical input and/or optical output for the SiP device 102, the micro-optical passive element 104, and/or the mirror 202. In an embodiment, the optical element 204 can be an optical fiber element. For example, in an embodiment, the optical element 204 can be a transceiver device (e.g., an optical transceiver) that facilitates fiber optic communication.

The micro-optical passive element 104 can be configured to align the set of optical waveguides 106 with the mirror 202 and/or the optical element 204. For example, in one or more embodiments, the micro-optical passive element 104 can be configured to optically link the set of optical waveguides 106 with the optical element 204. The micro-optical passive element 104 can also be configured to removably connect to the mirror 202 and/or the optical element 204. In an embodiment, the optical element 204 can provide the array of light beams (e.g., the array of light beams provided by the micro-optical passive element 104) onto the one or more optical fibers 206. For example, in one or more embodiments, the optical element 204 can be within a pluggable optical connector with a set of pins to facilitate connection between the one or more optical fibers 206 and the set of optical waveguides 106. The one or more optical fibers 206 can be configured to transmit pulses of infrared light. In certain embodiments, the one or more optical fibers 206 can be one or more single mode optical fibers. In certain embodiments, the one or more optical fibers 206 can be an optical fiber bundle. However, it is to be appreciated that, in certain embodiments, the one or more optical fibers 206 can be implemented in a different manner to facilitate communication of the array of light beams provided by the micro-optical passive element 104. In certain embodiments, the optical element 204 can be another SiP device. In certain embodiments, the optical element 204 can be an optical multiplexing device (e.g., an optical multiplexer device or an optical demultiplexer device). In one or more embodiments, the optical element 204 can be configured to provide optical communications via Coarse Wavelength Division Multiplexing (CWDM), Dense Wavelength Division Multiplexing (DWDM), coherent optical transmission, and/or another type of optical communication technique. For example, in an embodiment, the optical element 204 can be a CWDM optical module (e.g., a pluggable CWDM multiplexer component, a pluggable CWDM demultiplexer component, etc.) associated with CWDM technology. In another embodiment, the optical element 204 can be a DWDM optical module (e.g., a pluggable DWDM multiplexer component, a pluggable DWDM demultiplexer component, etc.) associated with DWDM technology. In yet another embodiment, the optical element 204 can be a coherent optical module (e.g., a pluggable coherent optical multiplexer component, a pluggable coherent optical demultiplexer component, etc.) associated with coherent optical transmission. In certain embodiments, the optical element 204 can include the mirror 202. In certain embodiments, the optical element 204 can be directly aligned with respect to the micro-optical passive element 104. Additionally, in certain embodiments, the optical element 204 can be directly mounted onto the micro-optical passive element 104.

FIG. 3 illustrates a system 100" according to one or more embodiments of the present disclosure. The system 100" can be an alternate embodiment of the system 100 and/or the system 100'. The system 100" includes the SiP device 102, the micro-optical passive element 104, the mirror 202, the optical element 204, one or more optical fibers 206, and an electronic integrated circuit (EIC) 302. In an embodiment, the system 100" can be a multi-chip module (MCM). The SiP device 102 of FIG. 3 includes the set of optical waveguides 106. Additionally, the cavity 110 is etched into the surface 108 and/or the surface 109 of the SiP device 102. In an embodiment, the system 100" can be a light coupling system to facilitate optical communications. In one or more embodiments, the micro-optical passive element 104 can be mounted on an edge of the cavity 110. In an embodiment, the EIC 302 can be an integrated circuit to facilitate optical communications via the SiP device 102. In one or more embodiments, the EIC 302 can control transmission of light via the set of optical waveguides 106. For example, in one or more embodiments, the EIC 302 can be configured as a driver for the transmission of light via the set of optical waveguides 106. In certain embodiments, the EIC 302 can include an amplifier configured to amplify one or more signals (e.g., incoming data) transmitted via the one or more optical fibers 206 and/or received via a photodiode (not shown). In certain embodiments, the EIC 302 can be configured to drive modulated light generation by driving a laser on/off or by driving a modulator that modulates light input into the modulator. In certain embodiments, the EIC 302 can be configured for logic processing, digital signal processing and/or control of the SiP device 102. In certain embodiments, the EIC 302 can be configured to manage a set of registers that store data associated with one or more transceiver operations, one or more transmitter operations, and/or one or more receiver operations.

FIG. 4 illustrates a system 100''' according to one or more embodiments of the present disclosure. The system 100''' can be an alternate embodiment of the system 100, the system 100' and/or the system 100". The system 100''' includes the SiP device 102 and the micro-optical passive element 104. Additionally, the cavity 110 is etched into the surface 108 and/or the surface 109 of the SiP device 102. In an embodiment, the system 100''' can be a light coupling system to facilitate optical communications. In an embodiment, the micro-optical passive element 104 includes one or more lenses 402. The one or more lenses 402 can, for example, provide optical signal(s) 404 to an external optical element (e.g., the optical element 204). The optical signal(s) 404 can be, for example, one or more light beams associated with optical communication. In an embodiment, the one or more lenses 402 can be an array of lenses that collimates light received from the set of optical waveguides 106 to form the optical signal(s) 404 (e.g., the array of light beams). For example, the one or more lenses 402 can be an array of collimating lenses that collimate the light received from the set of optical waveguides 106 to form the optical signal(s) 404 (e.g., the array of light beams). In an alternate embodiment, the one or more lenses 402 can be an array of lenses that focuses light (e.g., an array of light beams, optical signal(s)) onto the set of optical waveguides 106. For example, the one or more lenses 402 can be an array of focusing lenses that focus light (e.g., an array of light beams, optical signal(s)) onto the set of optical waveguides 106. In one or more embodiments, the one or more lenses 402 can be an array of micro-lenses. In an embodiment, the micro-optical passive element 104 can be mounted onto an edge 406 of the cavity 110 (e.g., as opposed to the surface 108 and/or the surface 109 of the SiP device 102). In certain embodiments, the SiP device 102 can include a through-silicon-via (TSV) 408 to facilitate an electrical connection (e.g., a vertical electrical connection) between the SiP device 102 and another electronic component (e.g., a substrate, a programmable interface controller, a microcontroller, etc.) mounted to a surface of the SiP device 102 (e.g., a surface 410 of the SiP device 102 or the surface 108 and/or the surface 109 of the SiP device 102). It is to be appreciated that, in certain embodiments of the system 100''', the optical signal(s) 404 (e.g., the array of light beams) can be captured by the mechanical structure 203 without bias of a light turning mirror (e.g., mirror 202).

FIG. 5 illustrates a system 500 according to one or more embodiments of the present disclosure. The system 500 includes a wafer 502. The wafer 502 can be, for example, a silicon wafer. The wafer 502 can include one or more SiP chips with a respective attached collimator chips. For example, in the embodiment illustrated in FIG. 5, the wafer 502 includes a SiP chip 504a with an attached collimator chip 505a, a SiP chip 504b with an attached collimator chip 505b, a SiP chip 504c with an attached collimator chip 505c, and a SiP chip 504d with an attached collimator chip 505d. The SiP chip 504a can be configured as described above with respect to the system 100, the system 100', the system 100", or the system 100'. Similarly, the SiP chip 504b, the SiP chip 504c and the SiP chip 504d can also be configured as described above with respect to the system 100, the system 100', the system 100" or the system 100'. In one or more embodiments, a dicing operation 506 and/or a dicing operation 508 can be performed with respect to the wafer 502 to separate the SiP chip 504a, the SiP chip 504b, the SiP chip 504c, and/or the SiP chip 504d. For example, in an embodiment, the dicing operation 506 can be performed with respect to the wafer 502 to separate the SiP chip 504a and the SiP chip 504c from the SiP chip 504b and the SiP chip 504d. In another embodiment, the dicing operation 508 can be performed with respect to the wafer 502 to separate the SiP chip 504a from the SiP chip 504c and/or to separate the SiP chip 504b from the SiP chip 504d. In another embodiment, the dicing operation 506 can result in a first optical apparatus (e.g., a first wafer with the SiP chip 504a), a second optical apparatus (e.g., a second wafer with the SiP chip 504b), a third optical apparatus (e.g., a third wafer with the SiP chip 504c), and/or a fourth optical apparatus (e.g., a fourth wafer with the SiP chip 504d). In certain embodiments, the dicing operation 506 and/or the dicing operation 508 can include scribing and separating of the wafer 502. In alternate embodiments, the dicing operation 506 and/or the dicing operation 508 can separate the wafer 502 using mechanical sawing (e.g., via a dicing saw). In alternate embodiments, the dicing operation 506 and/or the dicing operation 508 can separate the wafer 502 using laser cutting (e.g., via a laser). As such, a packaged module assembly can be provided to, for example, allow connection of collimators onto a chip at a wafer level. Furthermore, one or more optical tests can therefore be performed on chips at a wafer level. In certain embodiments, the SiP chip 504a includes a first cavity etched into a surface of a SiP device and a first micro-optical passive element mounted on an edge of the first cavity. Furthermore, in certain embodiments, the SiP chip 504b includes a second cavity etched into a surface of a SiP device and a second micro-optical passive element mounted on an edge of the second cavity. Additionally, in certain embodiments, the SiP chip 504c includes a third cavity etched into a surface of a SiP device and a third micro-optical passive element mounted on an edge of the third cavity. In addition, in certain embodiments, the SiP chip 504d includes a fourth cavity etched into a surface of a SiP device and a fourth micro-optical passive element mounted on an edge of the fourth cavity.

Embodiments of the present disclosure are described below with reference to flowchart illustrations. Thus, it should be understood that, in certain embodiments, one or more of the block of the flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably. Accordingly, the block diagrams and flowchart illustrations support various combinations of embodiments for performing the specified instructions, operations, or steps.

FIG. 6 is a flowchart illustrating an example method 600 for fabricating a silicon photonics collimator for wafer level assembly in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. In one or more embodiments, at operation 602, a cavity is etched into a silicon wafer associated with a set of optical waveguides. For example, the cavity can be formed via an etching process (e.g., a dry etching process associated with plasma or a wet etching process associated with chemicals) that removes one or more layers of the silicon wafer to form the cavity. In another example, the cavity can be formed via a laser process that removes one or more layers of the silicon wafer to form the cavity. In yet another embodiment, the cavity can be formed via a 3D printing process. In one or more embodiments, at operation 604, a micro-optical passive element is mounted onto an edge of the cavity, the micro-optical passive element being configured to direct optical signals between the set of optical waveguides and an external optical element. In an embodiment, the micro-optical passive element can be mounted onto the edge of the cavity via an adhesive bonding technique. In one or more embodiments, at operation 606, the silicon wafer is diced to form an optical apparatus that comprises the micro-optical passive element. In certain embodiments, the dicing of the silicon wafer can include scribing and separating of the wafer 502. In alternate embodiments, the dicing of the silicon wafer can separate the silicon wafer using mechanical sawing (e.g., via a dicing saw). In alternate embodiments, the dicing of the silicon wafer can separate the silicon wafer using laser cutting (e.g., via a laser). As such, the micro-optical passive element can be mounted at the wafer level before the silicon wafer is diced. In one or more embodiments, the method 600 further comprises attaching the optical apparatus to an optical fiber via the micro-optical passive element. In one or more embodiments, the method 600 further comprises attaching the optical apparatus to a silicon photonics (SiP) device via the micro-optical passive element. In one or more embodiments, the cavity is a first cavity, the micro-optical passive element is a first micro-optical passive element, and the method 600 further comprises etching a second cavity into the silicon wafer and/or mounting a second micro-optical passive element onto the edge of the second cavity. In one or more embodiments, the optical apparatus is a first optical apparatus, and the dicing comprises dicing the silicon wafer to form the first optical apparatus that comprises the first micro-optical passive element and a second optical apparatus that comprises the second micro-optical passive element. In one or more embodiments, the method 600 further comprises directing the optical signals to one or more lenses and/or providing the optical signals to the external optical element via the one or more lenses.

FIG. 7 is a flowchart illustrating an example method 700 for providing optical communications via a silicon photonics collimator in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 7 may, for example, be performed by an example computing system 900 (shown in FIG. 9). In certain embodiments, the computing system 900 can be embedded in an EIC (e.g., EIC 302). In certain embodiments, the computing system 900 can be embedded in an optical module (e.g., a silicon photonics transceiver module). In some embodiments, the computing system 900 is a firmware computing system embedded in an EIC (e.g., EIC 302) and/or an optical module (e.g., a silicon photonics transceiver module). In one or more embodiments, one or more of the operations illustrated in FIG. 7 may, for example, be performed by an EIC (e.g., EIC 302). In one or more embodiments, at operation 702, the computing system 900 configures an optical signal for transmission via a set of optical waveguides of a silicon photonics device. In one or more embodiments, at operation 704, the computing system 900 transmits the optical signal via the set of optical waveguides, where a micro-optical passive element mounted on an edge of a cavity etched onto a silicon surface of the silicon photonics device is configured to direct the optical signal from the set of optical waveguides to an external optical element.

FIG. 8 is a flowchart illustrating an example method 800 for providing optical communications via a silicon photonics collimator in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 8 may, for example, be performed by an example computing system 900 (shown in FIG. 9). In certain embodiments, the computing system 900 can be embedded in an EIC (e.g., EIC 302). In certain embodiments, the computing system 900 can be embedded in an optical module (e.g., a silicon photonics transceiver module). In some embodiments, the computing system 900 is a firmware computing system embedded in an EIC (e.g., EIC 302) and/or an optical module (e.g., a silicon photonics transceiver module). In one or more embodiments, one or more of the operations illustrated in FIG. 8 may, for example, be performed by an EIC (e.g., EIC 302). In one or more embodiments, at operation 802, the computing system 900 receives an optical signal associated with an external optical element, where a micro-optical passive element mounted on an edge of a cavity etched onto a silicon surface of a silicon photonics device is configured to direct the optical signal onto a set of optical waveguides of the silicon photonics device. In one or more embodiments, at operation 804, the computing system 900 processes the optical signal provided via the set of optical waveguides.

FIG. 9 illustrates the computing system 900 that may be embedded in an EIC (e.g., EIC 302) and/or an optical module (e.g., a silicon photonics transceiver module). In some cases, the computing system 900 may be a firmware computing system communicatively coupled with, and configured to control, one or more circuit modules associated with an optical module (e.g., a silicon photonics transceiver module). For example, the computing system 900 may be a firmware computing system and/or a controller computing system communicatively coupled with one or more circuit modules, such as an EIC (e.g., EIC 302) and/or an optical module (e.g., a silicon photonics transceiver module). The computing system 900 may include or otherwise be in communication with a processor 910, a memory circuitry 920, and communication circuitry 930. In some embodiments, the processor 910 (which may include multiple or co-processors or any other processing circuitry associated with the processor) may be in communication with the memory circuitry 920. The memory circuitry 920 may comprise non-transitory memory circuitry and may include one or more volatile and/or non-volatile memories. In some examples, the memory circuitry 920 may be an electronic storage device (e.g., a computer readable storage medium) configured to store data that may be retrievable by the processor 910. In some examples, the data stored in the memory 920 may include classical communication protocol data and/or quantum communication protocol data, or the like for enabling the apparatus to carry out various functions or methods in accordance with embodiments of the present invention, described herein.

In some examples, the processor 910 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 910 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 910 is a microprocessor.

In an example embodiment, the processor 910 may be configured to execute instructions, such as computer program code or instructions, stored in the memory circuitry 920 or otherwise accessible to the processor 910. Alternatively or additionally, the processor 910 may be configured to execute hard-coded functionality. As such, whether configured by hardware or software instructions, or by a combination thereof, the processor 910 may represent a computing entity (e.g., physically embodied in circuitry) configured to perform operations according to an embodiment of the present invention described herein. For example, when the processor 910 is embodied as an ASIC, FPGA, or similar, the processor may be configured as hardware for conducting the operations of an embodiment of the invention. Alternatively, when the processor 910 is embodied to execute software or computer program instructions, the instructions may specifically configure the processor 910 to perform the algorithms and/or operations described herein when the instructions are executed. However, in some cases, the processor 910 may be a processor of a device (e.g., a mobile terminal, a fixed computing device, a semiconductor fabrication device, a robot device, etc.) specifically configured to employ an embodiment of the present invention by further configuration of the processor using instructions for performing the algorithms and/or operations described herein. The processor 910 may further include a clock, an arithmetic logic unit (ALU) and logic gates configured to support operation of the processor 910, among other things.

The computing system 900 may optionally also include the communication circuitry 930. The communication circuitry may be any means embodied in either hardware or a combination of hardware and software that is configured to receive and/or transmit data from/to a network and/or any other device or module in communication with the computing system 900. In this regard, the communication interface may include, for example, supporting hardware and/or software for enabling communications. As such, for example, the communication circuitry 930 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising:
   a wafer;
   a first silicon photonics (SiP) device that comprises a set of optical waveguides formed at least partially in the wafer;
   a first cavity etched into a silicon surface of the wafer; and
   a first micro-optical passive element mounted on an edge of the first cavity prior to dicing of the wafer to form the first SiP device,
   wherein the first micro-optical passive element is configured to direct optical signals therethrough between the set of optical waveguides and an external optical element.

2. The apparatus of claim 1, further comprising:
   a mechanical structure that facilitates connection or disconnection between the external optical element and the first micro-optical passive element.

3. The apparatus of claim 1, further comprising:
   a second cavity etched into the silicon surface of the wafer; and
   a second micro-optical passive element mounted on an edge of the second cavity prior to dicing of the wafer to form a second SiP device.

4. The apparatus of claim 1, wherein the first micro-optical passive element is configured to direct the optical signals to one or more lenses, and wherein the one or more lenses provide the optical signals to the external optical element.

5. The apparatus of claim 1, wherein the first micro-optical passive element is configured to optically link the set of optical waveguides with the external optical element.

6. The apparatus of claim 1, wherein the first micro-optical passive element is configured to removably connect to the external optical element.

7. The apparatus of claim 1, wherein the first SiP device is a silicon optical chip.

8. The apparatus of claim 1, wherein the first micro-optical passive element is a light turning collimator.

9. The apparatus of claim 1, wherein the external optical element comprises an optical fiber.

10. The apparatus of claim 1, wherein the external optical element is another SiP device.

11. The apparatus of claim 1, wherein the external optical element is an optical multiplexing device.

12. A method, comprising:
    etching a first cavity into a silicon wafer associated with a set of optical waveguides;
    mounting a first micro-optical passive element onto an edge of the first cavity, wherein the first micro-optical passive element is configured to direct optical signals therethrough between the set of optical waveguides and an external optical element; and
    following mounting of the first micro-optical passive element, dicing the silicon wafer to form a first optical apparatus that comprises the first micro-optical passive element.

13. The method of claim 12, further comprising:
    attaching the first optical apparatus to an optical fiber via the first micro-optical passive element.

14. The method of claim 12, further comprising:
    attaching the first optical apparatus to a silicon photonics (SiP) device via the first micro-optical passive element.

15. The method of claim 12, further comprising:
    etching a second cavity into the silicon wafer; and
    mounting a second micro-optical passive element onto the edge of the second cavity.

16. The method of claim 15, wherein the dicing comprises dicing the silicon wafer to form the first optical apparatus that comprises the first micro-optical passive element and a second optical apparatus that comprises the second micro-optical passive element.

17. The method of claim 12, further comprising:
    directing the optical signals to one or more lenses; and
    providing the optical signals to the external optical element via the one or more lenses.

18. An apparatus comprising:
    a wafer;
    a first silicon photonics (SiP) device that comprises a set of optical waveguides formed at least partially in the wafer;
    a first cavity etched into a silicon surface of the wafer;
    a first micro-optical passive element mounted on an edge of the first cavity, wherein the first micro-optical passive element is configured to direct optical signals therethrough between the set of optical waveguides and a first external optical element;
    a second SiP device that comprises a set of optical waveguides formed at least partially in the wafer;
    a second cavity etched into the silicon surface of the wafer; and
    a second micro-optical passive element mounted on an edge of the second cavity, wherein the second micro-optical passive element is configured to direct optical signals therethrough between the set of optical waveguides and a second external optical element.

19. The apparatus of claim 18, wherein the first SiP device is independent of the second SiP device.

20. The apparatus of claim 18, wherein the first micro-optical passive element is configured to optically link the set of optical waveguides of the first SiP device with the first external optical element, and the second micro-optical passive element is configured to optically link the set of optical waveguides of the second SiP device with the second external optical element.

* * * * *